United States Patent [19]

Nolan et al.

[11] 4,061,535
[45] Dec. 6, 1977

[54] INDUSTRIAL TECHNIQUE

[75] Inventors: John Howard Nolan; Donald Lawrence Goddard; Barrett John Short, all of Lynchburg, Va.

[73] Assignee: The Babcock & Wilcox Company, New York, N.Y.

[21] Appl. No.: 670,314

[22] Filed: Mar. 25, 1976

[51] Int. Cl.[2] .............................................. G21C 9/00
[52] U.S. Cl. ..................................... 176/38; 137/514; 137/527.8; 176/65
[58] Field of Search ................. 176/37, 38; 137/514, 137/527.8; 188/1 C; 251/46

[56] References Cited

U.S. PATENT DOCUMENTS

| | | | |
|---|---|---|---|
| 2,078,375 | 4/1937 | Eldridge | 251/124 |
| 2,454,072 | 11/1948 | Long | 25/123 |
| 2,578,590 | 12/1951 | Perrault | 277/43 |
| 3,191,619 | 6/1965 | Allen | 137/527.4 |
| 3,410,511 | 11/1968 | Coppa | 244/138 |
| 3,494,607 | 2/1970 | Rusch | 267/1 |
| 3,572,465 | 3/1971 | Olson | 188/1 |
| 3,796,286 | 3/1974 | Kraupa | 188/1 C |
| 3,934,608 | 1/1976 | Guyton | 137/527.8 |

OTHER PUBLICATIONS

Power "Steam Generation", Apr. 1970, pp. 90 & 91.

*Primary Examiner*—Samuel W. Engle
*Assistant Examiner*—Ralph Palo
*Attorney, Agent, or Firm*—Joseph M. Maguire; John P. Sinnott; Angelo Notaro

[57] ABSTRACT

An illustrative embodiment of the invention provides pressure relief valve means for the core support cylinder of a nuclear reactor vessel during a failure or accident of the nuclear reactor system. The valve means is responsive to differential pressure across the valve which in one direction sealably seats the valve plate against the valve body, and which, in the other direction opens the valve for pressure relief of the cylinder. Moreover, the valve means is provided with energy absorbing means which limit the impact load of an "explosively" opening valve on the reactor vessel wall.

6 Claims, 4 Drawing Figures

INDUSTRIAL TECHNIQUE

BACKGROUND OF THE INVENTION

1. FIELD OF THE INVENTION

This invention relates to vent assembly systems and, more particularly, to a vent system for the release of vapor pressure in the core support cylinder of a nuclear reactor pressure vessel.

2. DESCRIPTION OF THE PRIOR ART

The conventional nuclear reactor pressure vessel generally comprises a longitudinally disposed cylindrical structure, closed at both ends by a convex base and a domed roof, and having reactor coolant inlet and outlet nozzles disposed in angular separation in a plane transverse to the longitudinal axis of the vessel and protruding therethrough. Housed within the pressure vessel structure is, among others, the nuclear reactor core ordinarily supported by a core support cylinder or shell suspended from an annular flange formed on the inner surface of the vessel. The core support cylinder comprises a distribution hoop, from which the primary coolant discharges through the outlet nozzles, and a thermal shield-skirt assembly, which supports the fuel elements in the reactor core and which in conjunction with the distribution hoop and the internal wall of the reactor pressure vessel serves as an annular hydraulic guide for the primary inlet coolant.

In operation, the fluid coolant, in forced circulation, enters the pressure vessel through the inlet nozzles, flows through the annular hydraulic guide formed between the inner surface of the pressure vessel and the core support cylinder, and rises through the reactor core whereupon it is discharged from the vessel through the outlet nozzles.

Furthermore, from a safety posture, nuclear reactor systems are generally enclosed in substantially leaktight concrete or steel containment structures to prevent radioactive materials such as gaseous, vaporized, solid or dissolved fission products from escaping from the containment in the event of a reactor accident. One such failure of the reactor system, the loss of coolant accident, or LOCA as it is commonly called in the nuclear reactor industry, results in flashing of the high pressure primary fluid, which pressurizes the containment, and rapid vaporization and therefore pressurization of the residual primary fluid remaining within the reactor vessel at the time of the LOCA. Accordingly, various safety systems have been suggested to suppress the vapor pressure build-up in the containment and, also, to provide emergency core cooling or flooding to the reactor core itself. However, in the event of accidental or catastrophic failure of the reactor system, a rapid pressure build-up in the reactor vessel, on the order of 500 pounds per square inch (psi) differential between the hoop area and the annulus in approximately one one hundredth (0.01) of a second, may occur and subsequent pressurization may prevent the emergency core coolant or flooding systems from adequately flooding the hot core with a coolant fluid. For example, during a LOCA involving the primary inlet coolant line, flow is interrupted, preventing the primary coolant from entering the core. The hot nuclear reactor core, however, continues to produce energy in the form of heat. The coolant pressure within the reactor vessel rapidly decreases to the saturation pressure, at which point coolant vapor accumulates and increases the pressure in the distribution hoop area. Moreover, a typical nuclear reactor vessel requires, during normal operation, on the order of hundreds of thousands of gallons of coolant per minute to adequately cool the reactor core and, therefore, an interruption of the primary coolant flow will allow excessive heat accumulation in the core and produce excessive heat transfer to the residual coolant within the vessel. The excessive heat transfer to the residual coolant may result in sufficient overpressurization of the coolant in the shell, such that, the decay heat removal systems or emergency core cooling systems may be prevented from flowing into and adequately cooling the core due to the over pressure of the heated residual coolant. Therefore, the performance of the emergency core cooling or flooding systems may be nullified or at least reduced resulting in a potential build-up of reactor core decay heat and a possible melt down of the core.

A simple "heavy" flapper type valve responsive to differential pressure across the valve and which will automatically open as the pressure increases in the core support cylinder has been suggested as a possible core cylinder venting means. However, since the pressure rise within the core support cylinder during, for example, a LOCA occurs almost instantaneously to hundreds of psi, the valve will "explosively" open, accelerating outwardly towards the vessel's internal wall at speeds approaching that of the sonic velocity of the vapor. Furthermore, since the dimension of the annulus between the core support cylinder and the internal wall of the reactor pressure vessel is ordinarily limited, an "explosively" opened valve of sufficient valve plate opening size for adequate pressure release will contact the reactor vessel's internal wall with sufficient force to cause severe deformation of the valve. Furthermore, in order to simplify the analytical analysis of valve plate deformation it has been suggested to incorporate into the valve system a "heavy" boss protruding outwardly from the plate into the annulus. However, since the "heavy" boss will also "explosively" contact the vessel wall there is the possibility that the "heavy" boss and valve plate will locally over stress the wall in the vicinity of the contact point. In addition, the valve-wall contact force may also substantially deform the valve hinge pin, such that the valve, if subsequently closed by incoming emergency coolant, may not reopen in responsive to a successive relatively low differential pressure build-up across the core support cylinder.

Accordingly, there is a need to provide venting means to the distribution hoop of the core support cylinder of a reactor pressure vessel which, during an accident or failure of the reactor, will relieve the pressure build-up in the core support cylinder, will not impose excessive loads upon the reactor vessel wall and which, subsequent to the initial response to a pressure build-up in the core support cylinder during, for example, a LOCA, will remain functional in response to successive relatively low differential pressure build-ups.

SUMMARY OF THE INVENTION

In accordance with the invention, a core support cylinder for a reactor pressure vessel is provided with valve means actuated by differential fluid pressure build-up between the hot core fluid and the cool annulus fluid to automatically relieve or vent the fluid pressure in the core support cylinder during a reactor system failure or accident, for example, a loss of coolant accident. Moreover, the valve or pressure releasing means is provided with energy absorbing means to limit the valve's impact load on the internal wall of the reactor vessel and to limit the load on the valve's hinge pin to prevent distortion of the hinge and thereby ensure that the valve remains functional in response to subsequent differential pressure build-up.

Specifically, a reactor pressure vessel - core support cylinder venting means that has these features comprises an energy absorbing plate in sealing engagement with the core support cylinder, a hinge supporting the plate and allowing outwardly directed rotational movement of the plate, an energy absorbing strap connecting the plate to the hinge and an energy absorbing member mounted on the external face of the plate and extending outwardly therefrom into the annulus.

More specifically, the energy absorbing reactor internal vent assembly of this invention comprises: a valve body or frame detachably and sealably connected to a mounting ring which, in combination therewith, define a venting passageway through the core support cylinder; a plate or circular disc and hinge means suspending the disc from the body and allowing outwardly directed rotational movement of the disc. In addition, the vent assembly is provided with an energy absorbing column which provides both mechanical and hydraulic absorption means for limiting the impact load of the vent assembly on the pressure vessel wall by means of deformation of the column and compression and forceful expulsion of the inlet fluid located within a hollow portion of the column, respectively. Furthermore, energy absorption is also provided by a "light" weight disc which not only reduces the impact energy due to its light weight but also, provides for energy absorption by deformation of the disc during impact. In addition, energy absorption is also provided by load limiting hinge straps which limit the impact load on the hinge to the plastic deformation load of the straps. That is, after the vent assembly's initial impact with the wall, plastic deformation of the straps may occur as the disc attempts to translate along the vessel wall, limiting the hinge load to the plastic deformation load/of the strap. The reactor internal vent assembly of this invention also includes a stem portion attached to the internal face of the disc and extending inwardly therefrom to prevent the disc assembly, if separated from the hinge, during normal reactor operation from falling downwardly through the annulus to the bottom of the reactor vessel and then upwardly into destructive contact with the core.

Therefore, in accordance with this invention the energy absorbing vent assembly provides an effective automatic means for venting the core support cylinder while limiting the inpact load applied to the reactor vessel wall.

The various features of novelty which characterize the invention are pointed out with particularlity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention. BRIEF DESCRIPTION OF THE DRAWINGS FIG. 1 shows an illustrative nuclear reactor pressure vessel partly in section embodying principles of the invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawings.

Figure 1:
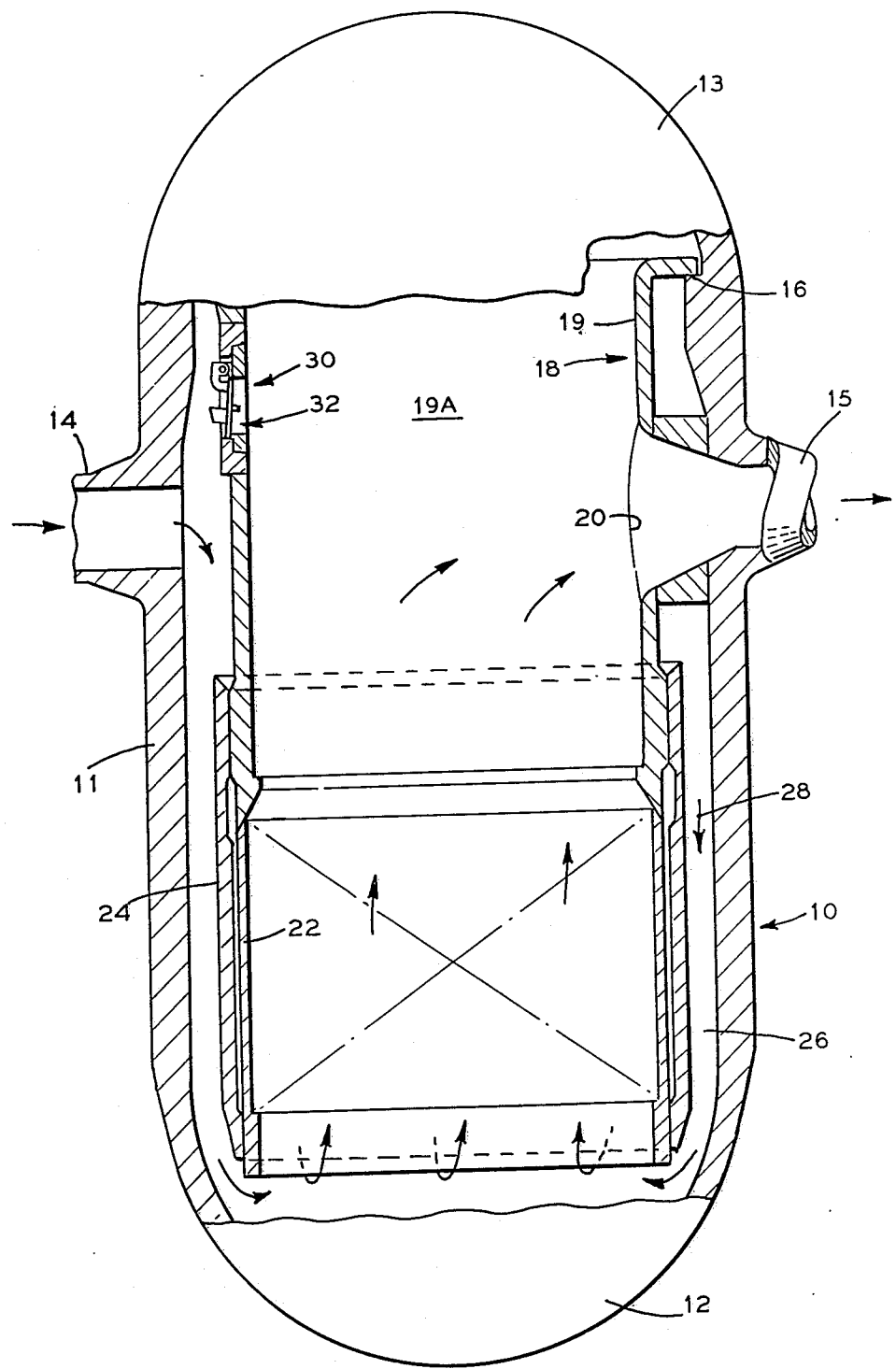

As illustrated in FIG. 1, a nuclear reactor pressure vessel 10 having a longitudinally disposed cylindrical envelope or wall 11 closed at each end by a convex base 12 and a domed roof 13 generally includes reactor coolant inlet and outlet nozzles 14 and 15 respectively, protruding from the vessel wall 11 near the domed roof 13. These nozzles, 14 and 15, are generally all disposed in the same lateral plane, that is, transverse to the longitudinal axis of the cylindrical vessel and are separated from each other with an angular displacement. Within the vessel 10, an annular flange 16 formed on the internal surface of the wall 11 serves as a means for supporting a core support cylinder 18 which includes a vertically disposed distribution hoop 19 formed with an opening 20 aligned with the outlet nozzle 15 for reactor coolant discharge.

The core support cylinder 18, or more particularly, the distribution hoop 19 is extended by means of a skirt 22 and a thermal shield 24 which in cooperation with the vessel wall 11 serve as an annular hydraulic guide or passageway 26 to accommodate the incoming primary fluid coolant entering the passageway 26 in the direction indicated by means of arrows 28. In addition, the skirt 22 supports the fuel elements in the reactor core (not shown).

In operation, the primary coolant enters the pressure vessel 10 through the inlet nozzle 14, flows downwardly through the annulus or passageway 26, rises within the core support cylinder 18 through the hot reactor core (not shown) to the distribution hoop area 19A, whereupon the heated coolant is discharged from the vessel 10 through the hoop opening 20 and the outlet nozzle 15.

Figure 2:
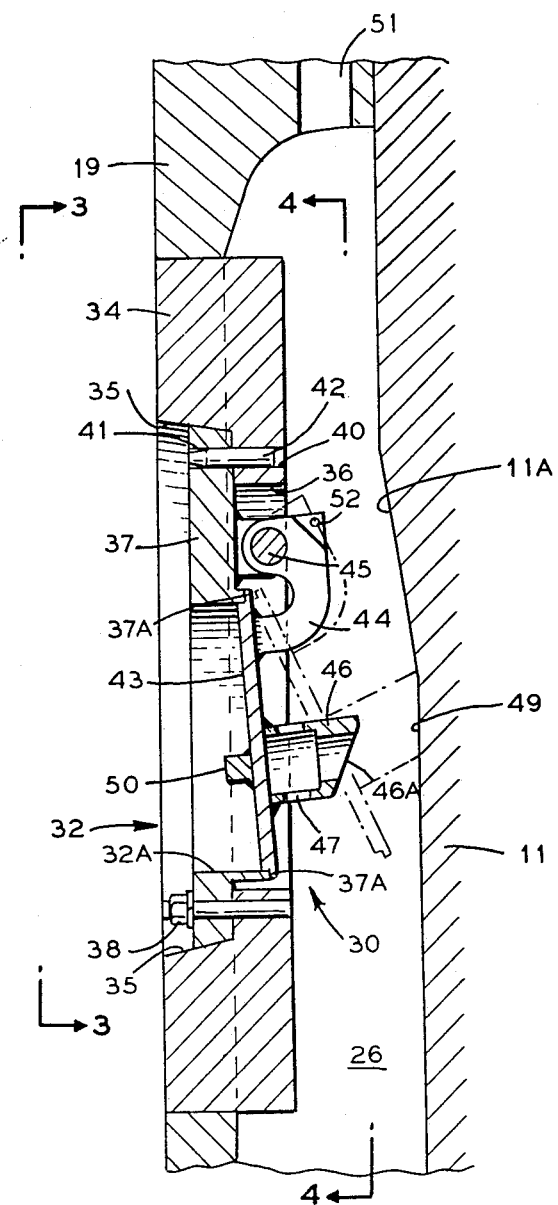
FIG. 2 is a sectional view of a core support cylinder vent assembly embodying principles of the invention showing a portion of the pressure vessel and core support cylinder in section.

In accordance with the invention, a plurality of vent assemblies 30, FIG. 2, only one being shown in FIG. 1, are disposed in the distribution hoop 19 in closed sealing engagement with a respective venting passageway 32 through the hoop 19. Preferably, the vent assemblies 30 are disposed in a plane above that of the inlet and outlet lines and, more particularly, disposed near the top of the distribution hoop 19 and vertically distant from emergency core flooding inlets (not shown) disposed in the passageway 26.

Figure 3:
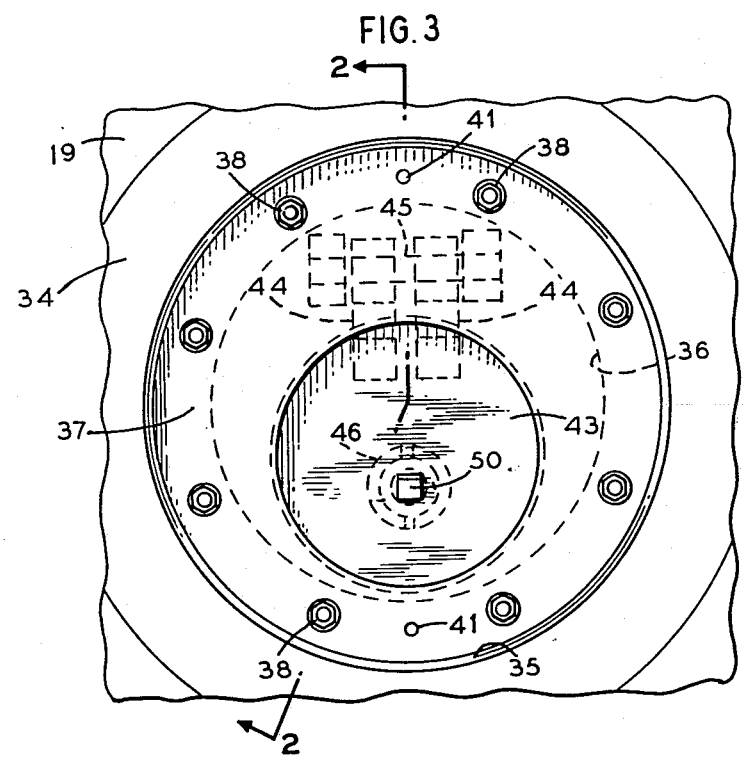
FIG. 3 is a view of the vent assembly of FIG. 2 taken along line 3—3.
Figure 4:
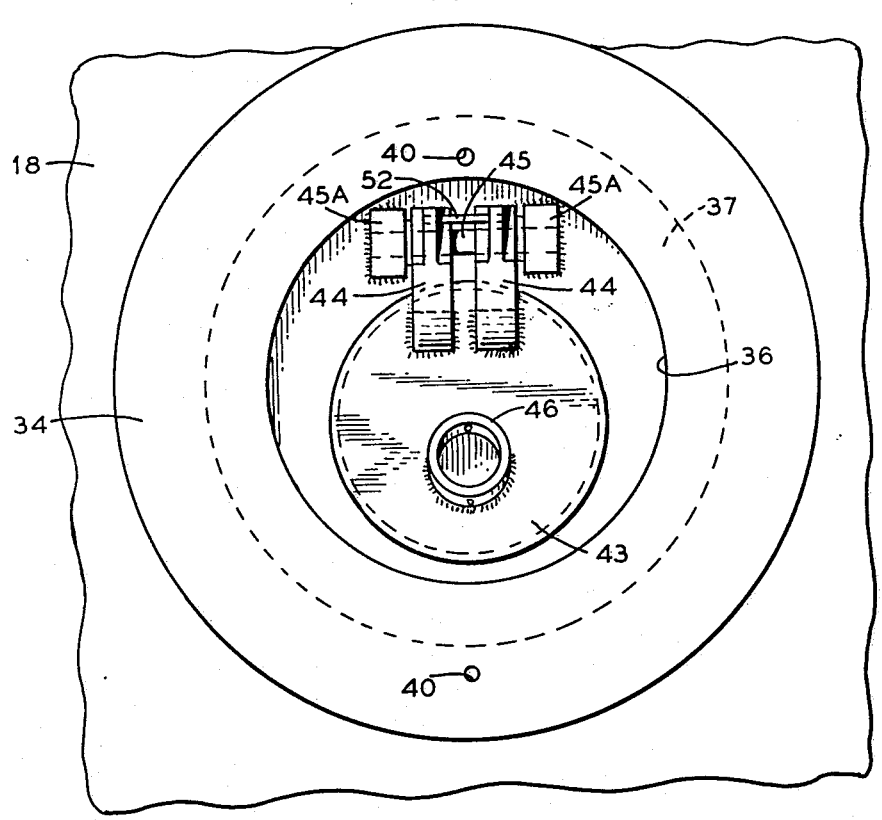
FIG. 4 is a view of the vent assembly of FIG. 2 taken along line 4—4.

As illustrated in FIGS. 2,3 and 4, the vent assembly 30 comprises a mounting ring 34 attached to the hoop 19 to establish fluid communication by means of a fluid passageway 35. In addition, the mounting ring 34 includes a radially inward extending lip portion 36, a pair of alignment holes 40 extending through the ring, and a pin 42 inserted into and tack welded to each of the holes 40 for locating purposes. Moreover, one end of the pins 42 extends out of the hole 40 and inwardly towards the hoop area 19A within the passageway 35 having a tapered end 42A for ease of alignment purposes. The vent assembly 30 further comprises a body portion 37 detachably connected to the ring 34 by means of a plurality of mounting bolts 38 circumferentially disposed about the body and including a pair of alignment holes 41 therethrough of sufficient size for ease of alignment of the body portion 37 with the tapered ends of pins 42 of the ring 34 during assembly thereof. Accordingly, the body portion 37 is aligned within the passageway 35 and bolted against the lip portion 36 in seated sealing engagement with the ring 34. The body portion 37, moreover, defines the pressure relief venting passageway 32A, through the hoop 19 for pressure relief purposes during, for example, an accident. A valve plate or disc 43 is suspended across the venting passageway 32A in sealing engagement with a seat portion 37A by means of a hinge strap 44. The strap 44 is connected to a valve hinge pin 45 attached to the body portion 37 by means of valve members 45A and allows outwardly directed rotational movement of the plate. Accordingly, the vent 30, or more particularly, the suspended plate 43, being responsive to forces acting thereon, is ordinarily sealably closed against the body seat portion 37A by the high pressure inlet fluid within the passageway 26, that is, by a radially inwardly directed differential pressure acting upon the plate 43. However, in the event of a failure or accident such that the pressure differential across the vent 30 is directed outwardly, that is the pressure within the hoop 19 is greater than the pressure within the primary fluid passageway 26, the vent plate 43 will automatically rotate about the hinge pin 45 into the passageway 26, opening the area 19A to the passageway 26 and thereby relieving the pressure within the core cylinder 18.

Extending outwardly from the plate 43 into the passageway 26 is an energy absorbing column 46 designed to impact the vessel wall 11 as shown in phantom, FIG. 2 at surface 49. The energy absorbing characteristics of the column 46 are provided by the generally annular construction, which by variation of the size length and wall thickness of the column 46 will cause mechanical compression thereof at predetermined loads. Furthermore, hydraulic absorption of the impact energy is also provided by the column 46 by means of the compression of the fluid coolant trapped within the hollow portion of the column and violently expelled outwardly therefrom, as a result of the impact and mechanical deformation of the column, through an orifice 47. In addition, the outwardly extending end face 46A of the column 46 may be formed at an angle to the column's longitudinal center line, as shown in FIG. 2, such that a substantially flush or fluid tight contact between the face 46A and wall surface 49 is made. In this way, the fluid trapped within the column at the instant of contact may only escape through the orifice 47. Furthermore, as is common in the art, portions of the face 46A may be ground to prevent the formation of a sharp cutting edge thereon.

Accordingly, during normal operation of the nuclear reactor system, the primary coolant pressure sealably closes the valve plate 43 against the body portion 37 due to an inwardly directed pressure differential. However, as explained above, during an accident or failure, such as a LOCA, the very rapid pressure rise in the cylinder "explosively" opens the valve plate 43 which allows the pressurized fluid to escape through passageway 32 into the primary coolant annulus 26.

Moreover, the impact of the valve of this invention and, more particularly, the column 46 with the wall 11 is reduced due to the "light" weight valve system of this invention as compared to the "heavy" prior art systems. That is, at the same impact velocity, the sonic speed of the escaping fluid, a lighter plate has less kinetic energy than a heavy plate. In addition, energy absorption is also accomplished, according to this invention, by the mechanical deformation or crushing of the column 46 as it contacts the wall 11, locally deforms the wall and imbeds into the wall. The insertia of the plate 43, moreover, not only bends or deforms the plate, but also laterally displaces the plate in a direction tangential to the arcuate path of travel at impact. The motion of the plate thereby causes distortion of the strap 44 or further energy absorption. Hence, the bending or deformation load of the strap, which may be varied according to the material employed and the size thereof, is the maximum load transferred to the hinge pin 45. In addition, bending of the "light" weight disc or plate 43 of this invention will also absorb some of the impact energy thereby further reducing the stress on the wall 11.

In the illustrative embodiment of this invention, as shown in the accompanying drawings, the plate 43 is hung at a slight angle to the vertical, approximately 5 degrees, so that the gravitational force acting on the plate ensures the initial seating of the plate to the seat portion 37A, and two straps 44 are provided as a redundant safety feature. Furthermore, the plate 43 also includes a stem 50 extending inwardly therefrom. As a practical matter, the stem 50 is provided, as a safety feature, to prevent a detached valve plate from progressing through the primary coolant annulus 26 during normal reactor operation into destructive contact with the core. That is, the stem 50 is of sufficient length such that the width of the valve plate, from the end of the stem 50 to the end of the column 46 is larger than the annulus between the vent 30 and the vessel wall 11.

In practice, the responsiveness of the valve plate 43 to an imposed load may be tested, for safety considerations and to ensure the operation or opening of the valve in an emergency or accident situation, in the following manner. A passageway 51, FIG. 2, provided in the hoop allows access to the vent 30 by means of an exercising tool (not shown), e.g. a hooked rod. The hooked rod engages means on the strap 44, such as a pin 52, FIGS. 2 and 4, and at a certain minimum imposed load, as measured by a spring balance, lifts the plate 43 off the seat 37A. Furthermore, the minimum imposed load for operation of the valve in response to a minimum pressure differential may be calculated by one skilled in the art, to establish the imposed load for testing purposes.

In accordance with this invention, vent relief of the core support cylinder during an accident or failure is provided by a vent assembly attached to the distribution hoop and, in addition, this vent assembly provides energy absorbing means which during operation of the valve, that is, upon impact of the valve with the reactor wall will absorb some of the impact energy and thereby preclude the possibility of locally overstressing the reactor wall. Furthermore, the energy absorbing means also includes means which limit the load on the valve's hinge thereby preventing deformation of the hinge and ensuring continued responsiveness and operation of the valve if subsequently closed.

The embodiments of the invention in which an exclusive property or privilege is claimed are defined as follows:

1. An energy absorbing pressure relief valve for a core support cylinder of a nuclear reactor comprising a valve body for fluid flow therethrough having portions defining a fluid passageway, hinge means attached to the body, a plate suspended from the hinge means in sealing engagement with the passageway, an energy absorbing deformable member mounted on the plate and extending outwardly therefrom, the deformable member including a partially annular column open at its outwardly extending end and orifice means through the walls of said annular column.

2. An energy absorbing valve according to claim 1 wherein said hinge means includes an energy absorbing strap supporting said plate allowing rotational movement of said plate with respect to said passageway.

3. An energy absorbing valve according to claim 1 wherein said annular column further includes orifice means through the walls of the column to establish fluid communication between the interior portion of the annular column and said fluid passageway.

4. A vent assembly for a core support cylinder of a nuclear reactor pressure vessel comprising a valve body attached to the cylinder having portions defining a fluid flow passageway through the cylinder, hinge means attached to the body, a valve plate suspended from the hinge means in sealing engagement with the body portions defining the passageway and rotatable outwardly from the cylinder, an energy absorbing deformable member mounted on the plate and extending outwardly from the cylinder, the deformable member including a partially annular column open at its outwardly extending end.

5. A vent assembly according to claim 1 wherein said annular column includes orifice means through the walls of the column for fluid communication between the interior and exterior of said annular column.

6. A vent assembly according to claim 5 wherein said hinge means includes an energy absorbing strap.

* * * * *